July 9, 1957
L. ARNETT ET AL
2,798,643
DISPENSING APPARATUS
Filed April 28, 1955
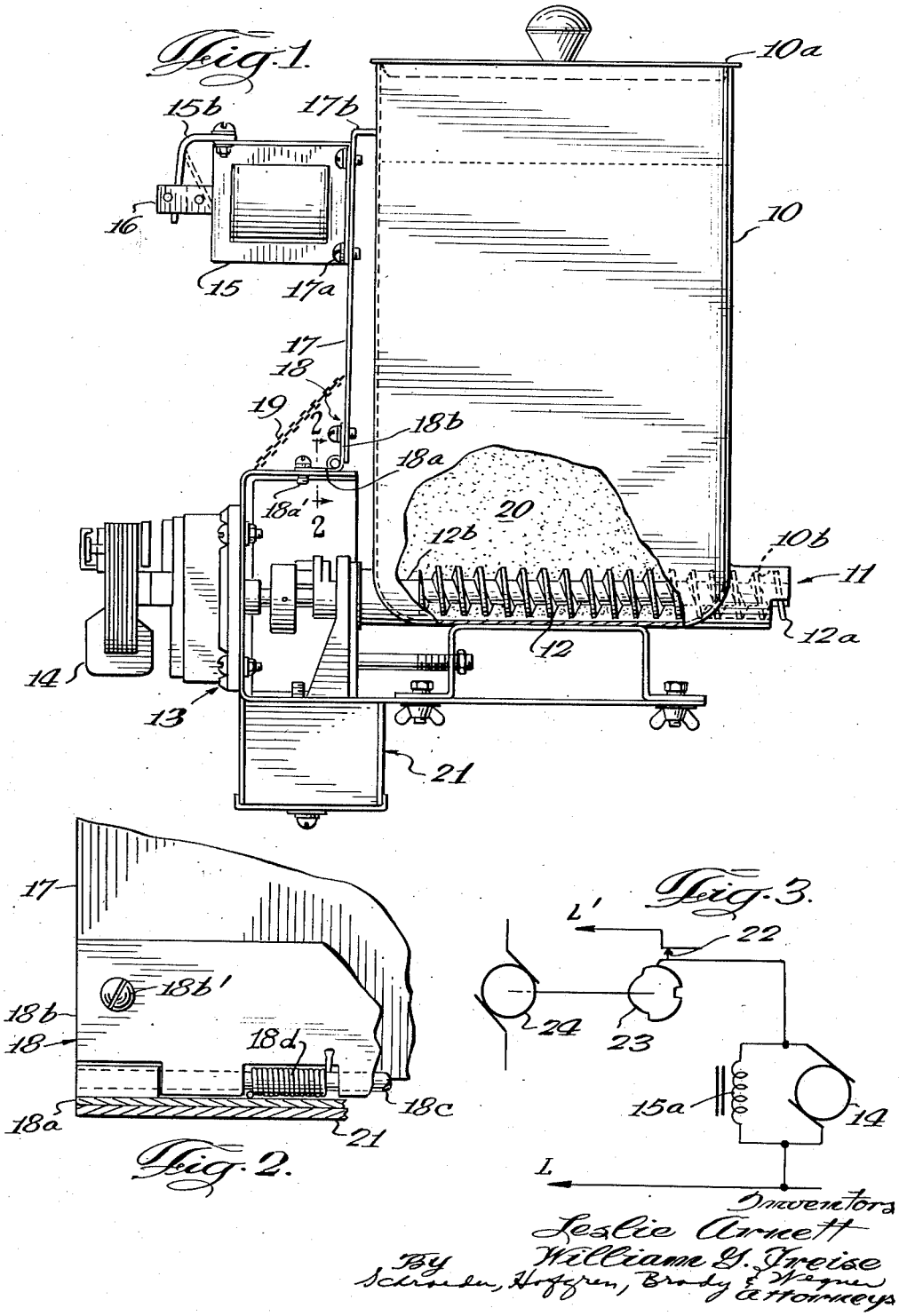
Inventors
Leslie Arnett
William Y. Freise
By Schroeder, Hofgren, Brady & Wegner
Attorneys

United States Patent Office 2,798,643
Patented July 9, 1957

2,798,643

DISPENSING APPARATUS

Leslie Arnett and William G. Freise, Chicago, Ill., assignors to United Coffee Corp., a corporation of Illinois Application April 28, 1955, Serial No. 504,491

6 Claims. (Cl. 222—181)

This invention relates to a dispensing apparatus and, more particularly, to means for agitating material to be dispensed.

Where particulate or granular material such as powdered sugar or cream is to be dispensed from an apparatus such as a beverage dispenser, means are provided to store a quantity of the particulate material, and, when desired, dispense a small portion thereof from the bottom of the storage means by suitable dispensing means. It has been found, however, that powdered material does not gravitate downwardly evenly at all times due to caking and similar effects so that, at times, improper dispensing results wherein a reduced quantity or no quantity is actually dispensed.

To prevent this undesirable effect, means for agitating the mass of material contained in the storage means are provided. The agitating means now found in the art have several serious disadvantages however; they generally comprise paddles or similar stirring devices adapted to be inserted within the storage means for stirring the powdered material and thus require rigorous cleaning to preclude contamination of the powdered material. Further, such agitating means are often disposed at the bottom of the container, being formed integral with the dispensing means, and act to stir the material only adjacent said bottom so that caking may occur in the upper portion of the material mass. Another disadvantage lies in the requirement for disassembly of such agitating means whenever the storage means is removed for such purposes as cleaning.

The principal feature of this invention, therefore, is the provision of a dispensing apparatus with a new and improved means for agitating material stored therein.

Another feature is that the agitating means is externally disposed relative to the container in which the material is stored allowing the container to be readily removed for purposes such as cleaning and obviating the need for extreme cleanliness of the agitating means.

A still another feature of the invention is the provision of such agitating means having a member arranged to strike the container sharply so as to jar and agitate the material contained therein.

A further feature of the invention is that such agitating means is yieldingly mounted in abutment with the container to allow the ready removal of the container from engagement therewith and absorb recoil shock forces produced.

A yet further feature is that such agitating means is arranged to be actuated whenever the dispensing means is actuated so that intermittent striking occurs and agitation is effected at the time of dispensing.

A yet further feature is that such agitating means comprises an electric solenoid arranged to be electrically connected to motor means actuating the dispensing mechanism so that the functioning of the dispensing means and the agitating means is simultaneous.

Other features and advantages of this invention will be apparent from the following description taken in connection with the accompanying drawings wherein:

Figure 1 is a side elevational view partly broken away of a dispensing apparatus provided with agitating means embodying the invention;

Figure 2 is an enlarged fragmentary view of the pivotal connecting means for mounting the agitating means solenoid on the dispensing apparatus, and;

Figure 3 is an electrical schematic diagram of the dispensing motor and agitating means solenoid circuits.

Reference now being had to the drawings, an agitating means embodying the invention is shown in a dispensing apparatus comprising a storage container 10 provided with a dispensing means generally designated 11 arranged to discharge powdered material 20 from the lower portion of the container. Mounted on a portion of the dispensing means 11 by a suitable support is an agitating solenoid 15 disposed adjacent a portion of the container 10 so that when actuated the solenoid plunger 16 is caused to force the support sharply against the wall of the container, thereby jarring and agitating the material 20 within the container.

Container 10 comprises a hollow receptacle having an open upper end provided with a cover 10a and a generally closed bottom end with a laterally opening discharge port 10b. Container 10 may be formed of any material which may be readily cleaned and having sufficient strength to absorb strikings of solenoid plunger 16 without permanent deformation, a thin-walled stainless steel receptacle being typical and satisfactory for this purpose.

Dispensing means 11 may take the form of any of the powdered material dispensing devices known in the art. For purposes of this disclosure a typical dispensing means wherein a worm conveyor 12 is disposed within and across the bottom of the container 10 having a free end 12a terminating within the discharge port 10b and a driven end 12b extending through the wall of the container and attached to a suitable rotary drive mechanism 13 including an electric motor 14. A support 21 is provided on which the drive mechanism 13 and electric motor 14 are mounted and which removably supports the container 10.

Worm conveyor 12 is caused to rotate by action of motor 14 through drive mechanism 13 so as to move material 20 surrounding it outwardly through the port 10b (to the right as seen in Fig. 1). The material discharged from the port 10b may be channeled therefrom by suitable means or allowed to fall freely into suitable receiving containers (not shown).

Solenoid 15 is carried by an L-shaped support plate 17, being fixedly attached thereto by suitable securing means as screw 17a. A right-angularly-extending end portion 17b of the plate is arranged to engage the container 10. When coil 15a of the solenoid 15 is electrically energized, the plunger 16, having been positioned in the withdrawn position (as seen in Fig. 1) by action of a return spring 15b carried by the solenoid, will be caused to strike plate 17 sharply with the resultant shock force being transmitted to the container 10 through plate end 17b.

Support plate 17 is pivotally secured at the end opposite portion 17b to the support 21 by means of a spring loaded hinge 18. A first hinge plate 18a is fixedly secured to the support 21 as by screws 18a' and is pivotally secured to a second hinge plate 18b by a pintle 18c. Screws 18b' are provided for attaching second hinge plate 18b to the support plate 17. A coil spring 18d is mounted on the pintle 18c with the spring ends under tension and abutting the hinge plates urging them into an opened relationship (in a clockwise direction as seen in Fig. 1). Such urging action causes the end portion 17b of the support plate yieldingly to abut the container 10 for transmitting the agitating force. The rotational movement of plate 17 may be limited by stop means, as chain 19 to maintain the plate generally upright whenever container 10 is removed from the dispensing apparatus.

As seen in Fig. 3, electric motor 14 and solenoid coil 15a are electrically connected in parallel so that simultaneous actuation of each may be effected. One common connection therefrom is electrically connected to one side L of a power supply line and the other common connection is electrically connected through a switch 22 to the other side L' of the power supply. The opening and closing of switch 22 is controlled by cam 23 which is driven by a cam motor 24. As motor 24 may have other cams associated therewith, the functioning of the dispensing means 11 and the agitator solenoid 15 may be related to other operations in the brewing and dispensing cycle. If desired, however, switch 22 may be a manually operable type allowing control of the dispensing means and solenoid agitating means as desired.

The use of my new and improved agitating means is extremely simple and effective. Container 10 is simply and readily placed on support 21 with the worm conveyor 12 extending along the bottom portion of the container. Plate 17 having been maintained in a generally vertical position by stop means 19, plate end 17b will automatically abut the container wall and is yieldingly held thereagainst by action of coil spring 18d. The particulate material 20 such as powdered sugar is then placed in the container through the open end and cover 10a is placed on the top of the container to exclude foreign materials. When dispensing of a charge of the powdered material is desired, electric motor 14 is actuated by closing switch 22. Worm 12 is thus caused to rotate in a direction causing the powdered material surrounding it to be moved by the worm threads thereon outwardly through the port 10b of the container. This rotation is allowed to continue until the desired quantity of the powdered material is discharged from the port; for most purposes only a few turns are necessary. At the same time the motor 14 is energized, solenoid coil 15a will also be energized, electromagnetically drawing the plunger 16 inwardly (to the right as seen in Fig. 1) and causing its inner end to strike the adjacent portion of plate 17. As switch 22 maintains the circuit closed during the dispensing operation, a single such striking is effected as plunger 16 is maintained in the inserted position during the time coil 15a is energized. As a considerable jarring force is produced by the action of plate end 17b against the container 10, the material 20 contained within the container is agitated breaking up any cakes or lumps. Further, as the striking action is not of the continuous or vibrating type, the material tends to gravitate differently during the quiescent period between strikings from the manner in which it gravitates when the container is struck so that the channelizing effects which may be produced by vibrating means are precluded.

When the solenoid coil 15a and electric motor 14 are deenergized by the opening of the switch 22, solenoid plunger 16 is withdrawn from contact with bar 17 by means of the spring 15b, allowing the plunger again to strike the plate as described above when solenoid coil 15a is subsequently energized.

Transmission of the striking shock to the support 21 and the portions of the apparatus secured thereto is effectively curtailed by the resiliently hinged mounting of the solenoid on the spring hinge 18. Thus, the magnitude of the jarring force may be sufficiently great effectively to agitate the material 20 while the back thrust produced is absorbed by the hinge spring 18b effectively minimizing the jarring and loosening effect on the other portions of the device. As the solenoid 15 is mounted exteriorly of the container 10, it is not in contact with the powdered material contained therein and therefore does not require the meticulous cleanliness required in the interior of the container, thereby reducing the maintenance cost. Further, such exterior mounting precludes the necessity for disassembling the agitating means whenever the container 10 is removed for purposes such as cleaning, again reducing the maintenance cost. As the jarring action is imparted to all portions of the material 20 contained in the container, caking is effectively prevented throughout the mass rather than merely adjacent the conveyor 12.

While we have shown and described certain embodiments of our invention, it is to be understood that it is capable of many modifications. Changes, therefore, in the construction may be made without departing from the spirit and scope of the invention as defined in the appended claims.

We claim:

1. A dispensing apparatus of the character described, comprising: a container; means for dispensing a desired quantity of material from the bottom of the container; and means operatively associated with the dispensing means for effecting only a single jarring of the entire container each time the dispensing means is operated thereby to agitate material therein.

2. A dispensing apparatus of the character described, comprising: a container adapted to store particulate material; a member disposed in the container and extending outwardly therefrom adapted to convey material outwardly from the container; electrically-operated means for intermittently actuating the conveying member; and electrically-operated agitating means electrically-connected to said conveying member actuating means for simultaneous operation thereof, said agitating means being arranged to jar sharply the container only a single time each time the means for actuating the conveying member is operated.

3. A dispensing apparatus of the character described, comprising: a container adapted to hold particulate material; a dispensing worm extending outwardly from the interior bottom of the container through a port therein; electric motor means for intermittently turning said worm to dispense materials surrounding the worm through said port; and an electric solenoid mounted exteriorly of the container and having a coil electrically connected to said motor whereby the coil is energized whenever the motor is energized, and a plunger arranged to cause a sharp striking of the container when the plunger is electromagnetically actuated by the coil.

4. A dispenser comprising material holding means including a support and a container thereon, an electrically-operated solenoid having a plunger; and means operatively connected to the solenoid for yieldingly disposing the solenoid adjacent the container whereby said solenoid plunger may be actuated to cause said disposing means to strike sharply said container and said solenoid may bounce away from said container to preclude undesired dampening of the transmitted shock force.

5. The dispenser of claim 4 wherein the disposing means comprises a plate having one end pivotally carried by the container and an other end, means securing the solenoid to the plate at said other end, and spring means extending between the plate and the holding means urging said other end into yielding abutment with the container and acting to absorb recoil shock developed by the striking action by the plunger.

6. A dispenser of the character described, comprising: a support; a container removably carried on the support and having a discharge port; dispensing means extending into said container and said port; a plate movably secured to said support and having an end; spring means extending between the support and the plate yieldingly urging said plate end into abutment with the container; stop means on the support limiting movement of said plate caused the action of said spring when said container is removed from said support; and means operatively associated with the plate for sharply striking said plate to transmit a shock to the container.

(References on following page)

References Cited in the file of this patent

UNITED STATES PATENTS

| | | |
|---|---|---|
| 1,488,228 | Burns | Mar. 25, 1924 |
| 1,570,795 | Tainton | Jan. 26, 1926 |
| 2,130,005 | Gay | Sept. 13, 1938 |
| 2,541,742 | Booth | Feb. 13, 1951 |
| 2,560,480 | Rogers et al. | July 10, 1951 |
| 2,598,227 | Constantine | May 27, 1952 |
| 2,685,388 | Steiner | Aug. 3, 1954 |
| 2,709,541 | Mettler et al. | May 31, 1955 |

FOREIGN PATENTS

| | | |
|---|---|---|
| 951,171 | France | Apr. 11, 1949 |
| 142,201 | Australia | July 16, 1951 |